United States Patent Office 3,506,582
Patented Apr. 14, 1970

3,506,582
DRAIN CLEANER COMPOSITION AND PROCESS
Donald Paul Gertzman, Elkhart, Ind., assignor to Miles Laboratories, Inc., Elkhart, Ind., a corporation of Indiana
No Drawing. Continuation-in-part of applications Ser. No. 382,406, July 13, 1964, and Ser. No. 506,003, Nov. 1, 1965. This application Nov. 10, 1966, Ser. No. 593,303
Int. Cl. C11d 7/10, 7/22, 7/42
U.S. Cl. 252—157                7 Claims

ABSTRACT OF THE DISCLOSURE

An improved enzymatic drain cleaner composition is provided which includes a mixture of glucono-delta-lactone and a metal salt of carbonic acid. When this composition is mixed with water, the glucono-delta-lactone forms gluconic acid which reacts with the above metal salt to liberate carbon dioxide. The resulting effervescent action enables the active enzymes to more effectively penetrate deposits in the drain being cleaned. The ingredients of this composition are previously individually coated with a mixture of gum arabic and polyvinylpyrrolidone to prevent interaction prior to mixture with water.

---

This application is a continuation-in-part of U.S. Ser. No. 382,406, filed July 13, 1964, now abandoned, and of U.S. Ser. No. 506,003, filed Nov. 1, 1965, now abandoned.

This invention relates to an enzymatic drain cleaner. More particularly it relates to an effervescent enzymatic drain cleaner having sustained effervescent characteristics and improved cleaning properties and to a process for producing such enzymatic drain cleaner.

Clogged drain lines and other refuse conduits are potential problems faced by industry and homeowners. These clogged refuse conduits generally result from a gradual accumulation of water insoluble material, especially carbohydrates, proteins and fats, along the conduit walls. Such wall deposits are formed from the material flowing through the conduits. When the deposits accumulate to the point where the flow of fluids through the conduit is severely impaired or completely stopped, it is usually important to remove such deposits relatively quickly in order to restore proper service through the conduit.

One method which can be employed to remove gross deposits from a clogged conduit is to mechanically cut through the deposit mass. Often, however, the conduit is clogged at a point where it is inconvenient if not impossible to use mechanical removal means without dismantling at least a portion of the clogged conduit.

Another method which has been used in the prior art to remove deposits from clogged drains is the employment of alkalis, such as strong sodium hydroxide, to chemically react with the clogged material. The alkali-based drain cleaners operate on two major principles. First, the addition of strong alkali to water, which is present in the conduit or which is added in a desired amount, generates substantial quantities of heat. This heat is employed to melt and thus soften the fats in the clogged deposits so that can be more easily washed away. The second principle is that an alkali can react with fats to form soaps which can be readily washed away. This alkali method is quite useful to remove small deposits of material, especially fatty material, from the walls of a conduit as a preventive measure, but it is substantially less effective and often of no help at all for opening drains which have become completely clogged by the accumulated conduit wall deposits. The alkali method is also disadvantageous in that the alkali is a poison and can be quite injurious to humans and many materials upon contact.

The many disadvantages of the alkali method for drain cleaning prompted a search for alternative and better methods. One method proposed by the prior art is the use of enzymes for drain cleaning. It is well known that certain enzymes will attack materials commonly found in drain wall deposits and convert such materials to water-soluble products which are easily removed. While enzymes can be quite effective in reacting with drain deposits, their overall action is generally slow. This is caused principally by the fact that the enzyme effectiveness in removing the deposits is related to the penetration of the enzyme or enzyme mixture into the drain deposit. A water solution of enzymes by itself has a low penetration rate into a massive drain deposit.

It has been suggested in the prior art that the effectiveness of an enzymatic drain cleaner could be improved by including an effervescent couple in the composition. This effervescent couple, consisting essentially of a weak organic acid, such as citric acid, and an alkali or alkaline earth metal salt of carbonic acid, such as sodium bicarbonate, will react to generate carbon dioxide gas when it contacts water. The bubbles of carbon dioxide can tend to mechanically loosen and remove the particles of drain deposit near the surface where such particles have been attacked by the enzymes. This action enables the enzymes to more effectively penetrate the deposit. The prior art effervescent couples, however, still had some disadvantages. First, the effervescent couple started to generate copious quantities of carbon dioxide gas substantially immediately upon coming in contact with water. The resulting agitation mechanically prevented some of the enzyme mixture from reaching the surface of the drain deposit and thus tended to reduce the enzyme effectiveness. There was thus interference with enzyme penetration into the deposit. The prior effervescent compositions also had the disadvantage that the effervescent lasted for only a relatively short time.

It is an object of the present invention to provide an effervescent enzymatic drain cleaner composition which has improved enzyme penetration characteristics.

It is another object of the present invention to provide an effervescent enzymatic drain cleaner composition wherein the effervescent action does not start substantially immediate upon contact with water.

It is a further object of the present invention to provide an effervescent enzymatic drain cleaner composition wherein the effervescent action persists for a relatively long period of time.

In accordance with the present invention an effervescent enzymatic drain cleaner composition is provided which comprises a mixture of suitable enzymes which will attack the commonly encountered constituents of drain deposits and an effervescent couple consisting essentially of an alkali or alkaline earth metal salt of carbonic acid and a compound which provides gradual release of a weak organic acid in the presence of water. In order to be most useful in the present invention, such compound which provides gradual release of a weak organic acid should not be injurious to the enzyme activity of the drain cleaner composition and preferably should also not be injurious to humans. Glucono-delta-lactone is exemplary of such a compound and is preferably employed in the novel enzymatic drain cleaner.

Glucono-delta-lactone slowly produces gluconic acid in the presence of water. The gluconic acid then reacts with the metal salt in the composition to generate carbon dioxide gas. Since it requires a period of time of at least several minutes for the effervescent action to start, the enzyme mixture can start to penetrate the drain deposit immediately upon contact without any interference. Once the effervescent action starts, it begins to loosen and remove the enzyme-attacked surface portion of the drain deposit. This effervescent action continues for several hours, working in conjunction with the enzyme action to remove massive drain deposits. The principal feature of the present invention resides in the inclusion in the effervescent couple of a compound, such as glucono-delta-lactone, which provides gradual release of a weak organic acid.

More particularly, a composition useful for removing deposits from refuse conduits is provided in accordance with the present invention and comprises bacterial amylase, bacterial protease, lipase, non-pathogenic anaerobic and aerobic bacteria, pectinase, ficin, glucono-delta-lactone and a metal salt of carbonic acid wherein the metal is selected from the class consisting of alkali metals and alkaline earth metals. The bacterial amylase will attack carbohydrates and convert them to soluble sugars and dextrins. The bacterial protease and ficin will attack proteins and convert them to more soluble polypeptides and amino acids. The lipase will attack fats. The pectinase will attack pectins. The non-pathogenic anaerobic and aerobic bacteria will feed on the constituents of the drain deposit and generate additional enzymes which will also attack the drain deposit. The glucono-delta-lactone and the metal salt provide the effervescent couple. It is preferable that the composition also contain a wetting agent to aid in the penetration of the enzyme solution into a drain deposit as well as a filler to add bulk to the composition and aid in dispensing the enzyme mixture.

The amounts of the various enzymes, bacteria, wetting agent and filler are not narrowly critical and can be varied to provide suitable overall drain cleaner characteristics. The composition should contain from about 10 to about 45 weight percent of the compound, such as glucono-delta-lactone, which provides gradual release of the organic acid and from about 8 to about 45 weight percent of a metal salt of carbonic acid, such as sodium bicarbonate. Preferably, the composition should contain from about 10 to about 30 weight percent of the compound, such as glucono-delta-lactone, which provides gradual release of the organic acid and from about 10 to about 20 weight percent of a metal salt of carbonic acid.

The constituents of the enzymatic drain cleaner are well known materials and are readily available from commercial sources. The bacterial amylase and bacterial protease are conveniently obtained in a mixture useful in the present invention by the submerged fermentation of *Bacillus subtilis* in an aqueous bran fermentation substrate. The resulting fermentation mycelia are dried and used directly in the drain cleaner composition.

The lipase useful in the present invention can be obtained from microbial or pancreatic sources. The pancreatic lipase also contains some amylase and protease which help increase the overall enzymatic activity of the drain cleaner composition.

The non-pathogenic aerobic and anaerobic bacteria useful in the present invention are readily obtainable in soils.

Examplary metal salts of carbonic acid useful in the present invention are sodium bicarbonate, potassium carbonate, lithium bicarbonate, barium carbonate and the like. These salts must be sufficiently water-soluble to react with the acid component of the effervescent couple to generate carbon dioxide gas. Sodium bicarbonate is the preferred material.

Enzymatic drain cleaners prepared in accordance with the present invention can contain various amounts of enzymes. The illustrative examples included in the present application express the amounts of enzymes both in weight percentage amounts of enzymatic materials and also in enzyme potencies. The specific potencies of the various enzymes are expressed in the following ways.

Amylase.—Amylase activity is expressed in mg./mg. units. Amylase activity of 15 mg./mg. units, for example, indicates that 1 mg. of amylase material will produce 15 mg. of sugars, expressed as maltose, in 30 minutes at 40° C. and pH 6.9 from 50 ml. of a 2 weight percent aqueous soluble starch solution. The enzyme material to be tested is adjusted to such a concentration that it will catalyze the hydrolysis of about 20 weight percent of the soluble starch during the 30 minutes. The maltose content of the enzyme converted starch is then determined by the well known iodometric titration method.

Protease.—Protease activity is expressed in Northrop units. One Northrop unit is that amount of enzyme activity that will digest 0.8 g. of casein in one hour at 40° C. and pH 7.4. The casein is supplied in a 1 liter quantity of 0.2 weight percent aqueous solution. The enzyme material to be tested is adjusted to such a concentration that it will catalyze the hydrolysis of about 40 weight percent of the casein during the one hour.

Lipase.—Lipase activity is expressed in lipase units. One lipase unit is that amount of enzyme activity that will produce one milliequivalent of diolein and oleic acid in 2 hours at 37° C. and pH 7.3 from olive oil, calculated as triolein. The olive oil is supplied in a 5 ml. quantity containing 1250 mg. of olive oil. The enzyme material to be tested is adjusted to such a concentration that it will catalyze the hydrolysis of about 15 weight percent of the olive oil during the 2 hours.

Pectinase.—Pectinase activity is expressed in polygalacturonase units. One polygalacturonase unit is that amount of enzyme activity that will produce a relative fluidity change of 0.033 for a 1 ml. quantity of 0.2 weight percent aqueous sodium polypectate solution in 5 minutes at 30° C. and pH 4.2. The enzyme material to be tested is adjusted to such a concentration that it will produce a relative fluidity change of about 0.2.

Cellulase.—Cellulase activity is expressed in cellulase units. One cellulase unit is that amount of enzyme activity that will result in a relative fluidity change of 1.0 over a 5 minutes period at 40° C. and pH 4.5 for a 20 ml. quantity of aqueous cellulose gum solution containing 37.5 mg. of cellulose gum when treated with 1 ml. of enzyme material. The enzyme material to be tested is adjusted to such a concentration that will produce a relative fluidity change of about 0.18 to 0.22.

The invention will be described in further detail in the following examples.

EXAMPLE 1

The U-shaped trap in a standard sink drain (about 2 inches in diameter and about 16 inches long) was completely plugged with a mixture of restaurant garbage, hair and plant and animal fats. A 5 ml. quantity of water and a teaspoonful (about 4 grams) of an effervescent enzymatic drain cleaner having the following composition were placed on top of the above described drain plug:

| Weight percent: | Constituent |
| --- | --- |
| 10 | Mixture of bacterial amylase having a potency of 15 mg./mg. units and bacterial protease having a potency of 20 Northorp units/g. |
| 10 | Pancreatic lipase having a potency of 250 lipase units/g. and also containing protease activity of 140 Northrop units/g. and amylase activity of 102 mg./mg. units. |
| 10 | Mixture of non-pathogenic aerobic and anaerobic bacteria |
| 7 | Wetting agent (equal weight amounts of ethoxylated oleamide and polyoxyethylated alkyl phenol). |
| 1 | Pectinase having a potency of 20 polygalacturonase units/g. |

| | |
|---|---|
| 1 | Ficin having a potency of 1300 Northrop units/g. |
| 1 | Cellulase having a potency of 4000 cellulase units/g. |
| 10 | Sodium chloride filler. |
| 15 | Glucono-delta-lactone. |
| 35 | Sodium bicarbonate. |

After several minutes the water solution of the enzymatic drain cleaner began to slowly effevesce. The effervescence continued slowly for several hours during which time the liquid enzyme solution gradually worked its way through the plugged drain. An addition of 50 ml. of water washed out the loosened plug.

A prior art alkali-based drain cleaner and a prior art enzymatic drain cleaner without the glucono-deltalactone enervescent composition were either unable to satisfactorily clear a similar plugged drain or required a substantially longer period of time to clean the drain.

EXAMPLE 2

The U-shaped trap in a standard sink drain was completely plugged with a mixture of restaurant garbage, hair and plant and animal fats. A 5 ml. quantity of water and 8 g. of an effervescent enzymatic drain cleaner having the following composition were placed on top of the above described drain plug:

| Weight percent: | Constituent |
|---|---|
| 8 | Mixture of bacterial amylase and bacterial protease. |
| 8 | Mixture of non-pathogenic aerobic and anaerobic bacteria. |
| 8 | Pancreatic lipase. |
| 4 | Wetting agent (equal weight amounts of ethoxylated oleamide and polyoxyethylated alkyl phenol). |
| 1 | Pectinase. |
| 1 | Ficin. |
| 1 | Cellulase. |
| 8 | Sodium chloride filler. |
| 19.7 | Glucono-delta-lactone. |
| 41.3 | Sodium bicarbonate. |

The enzymes had the same potencies as described in Example 1.

After several minutes the water solution of the enzymatic drain cleaner began to slowly effervesce. The effervescence continued for 3 hours during which time the liquid enzyme solution gradually worked its way through the entire plug. The loose particles were then flushed out with water.

EXAMPLE 3

The U-shaped trap in a standard sink drain was completely plugged with a mixture of restaurant garbage, hair and plant and animal fats. A 5 ml. quantity of water and 8 g. of an effervescent enzymatic drain cleaner having the following composition were placed on top of the above described plug:

| Weight percent: | Constituent |
|---|---|
| 8 | Mixture of bacterial amylase and bacterial protease. |
| 8 | Mixture of non-pathogenic aerobic and anaerobic bacteria. |
| 4 | Pancreatic lipase. |
| 8 | Wetting agent (ethoxylated oleamide). |
| 1 | Pectinase. |
| 19.23 | Glucono-delta-lactone. |
| 40.77 | Sodium bicarbonate. |
| 1 | Ficin. |
| 10 | Sodium chloride. |

The enzymes had the same potencies as described in Example 1.

After several minutes the water solution of the enzymatic drain cleaner began to slowly effervesce. The effervescence continued slowly for several hours during which time the liquid enzyme solution gradually penetrated the plugged drain. The system was allowed to stand undisturbed overnight (about 16 hours). The next morning the trap was completely cleared upon addition of small amounts of flushing water.

EXAMPLE 4

Four U-shaped standard sink drain traps were completely plugged with a mixture of garbage, hair and plant and animal fats. This mixture was about 80 weight percent plant and animal fats. A 5 ml. quantity of water and 2 g. of the composition described in Example 3 above were added to each of three of these plugged drains. A 5 ml. quantity of water and 3 g. of a commercial prior art alkali drain cleaner were added to the fourth plugged drain. After several minutes the three water solutions of enzymatic drain cleaner began to slowly effervesce. After 10 minutes, each of the plugged drains in contact with the enzyme solutions began to become loosened. The effervescence continued slowly for several hours during which time the liquid enzyme solution gradually penetrated the plugged drain. The systems were allowed to stand overnight. The next morning the three enzyme treated traps were easily cleared upon addition of small amounts of flushing water.

The prior art alkali drain cleaner created substantial portions of heat at the top of the fourth plugged drain. This action partially liquefied the plug but did not penetrate any substantial distance into the plug. After about 15 minutes, the heat was dissipated and the liquefied portion solidified again. No further action was observed in this drain.

The above examples clearly show the improved characteristics of the effervescent enzymatic drain cleaner of the present invention as compared with prior art drain cleaners.

The following example describes the use of another composition of the present invention.

EXAMPLE 5

A U-shaped trap similar to that in a standard sink drain was completely filled with a mixture of restaurant garbage, hair and plant and animal fats. A 5 ml. quantity of water and 8 g. of an effervescent enzymatic drain cleaner having the following composition were placed on top of the above described plug:

| Weight percent: | Constituent |
|---|---|
| 8 | Mixture of bacterial amylase and bacterial protease. |
| 8 | Pancreatic lipase. |
| 8 | Mixture of non-pathogenic aerobic and anaerobic bacteria. |
| 4 | Wetting agent (ethoxylated oleamide). |
| 1 | Pectinase. |
| 1 | Ficin. |
| 18 | Sodium chloride. |
| 2 | Silica. |
| 30 | Glucono-delta-lactone. |
| 20 | Sodium bicarbonate. |

The individual enzymes have the same potencies as described in Example 1.

The overall potencies of the enzymatic drain cleaner composition were: about 9.5 mg./mg. units, about 16.5 Northrop units/g. and about 24.5 lipase units/g.

After several minutes the water solution of the enzymatic drain cleaner began to slowly effervesce. The effervescence continued slowly for several hours during which time the liquid enzyme solution gradually worked its way through the plugged drain. An addition of a small quantity of flushing water then cleared the drain.

EXAMPLE 6

A U-shaped trap similar to that in a standard sink drain was completely filled with a mixture of restaurant garbage, hair and plant and animal fats. A 5 ml. quantity of water and 8 g. of an effervescent enzymatic drain cleaner having the following composition were placed on top of the above described plug:

| Weight percent: | Constituent |
| --- | --- |
| 4 | Mixture of bacterial amylase and bacterial protease. |
| 4 | Pancreatic lipase. |
| 4 | Mixture of non-pathogenic aerobic and anaerobic bacteria. |
| 0.5 | Pectinase. |
| 0.5 | Ficin. |
| 15 | Glucono-delta-lactone. |
| 10 | Sodium bicarbonate. |
| 2 | Wetting agent (ethoxylated oleamide). |
| 0.2 | Balsam pine scent. |
| 1.2 | Silica gel. |
| 1 | Silica. |
| 57.6 | Sodium chloride. |

The individual enzymes have the same potencies as described in Example 1.

After several minutes the water solution of the enzymatic drain cleaner began to slowly effervesce. The effervescense continued slowly for several hours during which time the liquid enzyme solution gradually worked its way through the plugged drain. An addition of a small quantity of flushing water then cleared the drain.

The compositions of the present invention are preferably prepared by individually coating the enzyme mixture, the glucono-delta-lactone, and the sodium bicarbonate with a water-soluble inert coating. This coating prolongs the shelf life of the composition by preventing interaction between the active ingredients of the composition prior to use and it also imparts non-caking characteristics to the composition. While a number of coating materials may be employed in various concentrations, it is preferable that the coating material be an aqueous mixture of 6.5 percent gum arabic and 6.5 percent polyvinylpyrrolidone, said percents being on a weight/volume basis. After the individual composition constituents have been separately coated with the above aqueous mixture and then dried, these coated constituents can be mechanically blended together. The resulting composition mixture retains its enzyme potencies and has reduced caking tendencies upon storage over extended periods of time. When the composition is eventually mixed with water, the inert water-soluble coating dissolves and the ingredients can begin to react to remove drain deposits.

The following example describes the preparation of a preferred effervescent enzymatic drain cleaner composition.

EXAMPLE 7

An effervescent enzymatic drain cleaner composition having the following composition was prepared:

| Weight percent: | Constituent |
| --- | --- |
| 6 | Pancreatic lipase. |
| 4 | Mixture of bacterial amylase and bacterial protease. |
| 0.5 | Pectinase. |
| 0.5 | Ficin. |
| 4 | Mixture of non-pathogenic aerobic and anaerobic baceria. |
| 10 | Sodium bicarbonate. |
| 15 | Glucono-delta-lactone. |
| 57.8 | Sodium chloride. |
| 2 | Wetting agent (ethoxylated oleic acid amide). |
| 0.2 | Scenting agent (balsam pine scent). |

The individual enzymes have the same potencies as described in Example 1.

The composition was prepared in the following manner: The pancreatic lipase, bacterial amylase, baceterial protease, pectinase, ficin, non-pathogenic aerobic bacteria and non-pathogenic anaerobic bacteria were placed in a suitable mixer and blended until a uniform mixture was obtained. While mixing was continued, an aqueous coating solution containing 6.5 percent (weight/volume basis) gum arabic and 6.5 percent (weight/volume basis) polyvinylpyrrolidone (having an average molecular weight of 40,000) was sprayed onto the mixture until an amount equivalent to 14 weight percent of the enzyme mixture solids was added. After thoroughly mixing the coating solution with the solid materials, the resulting coated material was dried in an air drier at room temperature (about 20° C.–25° C.) for 30 minutes. The dried product was identified as constituent A.

The sodium bicarbonate was placed in a suitable mixer, and while mixing was continued, the above described gum arabic-polyvinylpyrrolidone solution was added in an amount of 27 weight percent based on weight of the sodium bicarbonate. Mixing was continued until a paste was formed. The paste was then dried on trays at a temperature not exceeding 60° C. After drying, the coated sodium bicarbonate was sifted through a 10 mesh screen to form constituent B.

The sodium chloride (pretzel size), wetting agent and balsam pine scent were placed in a suitable mixer and blended until the sodium chloride was uniformly coated with the liquids. The powdered glucono-delta-lactone was then added and blended so that it all adhered to the wet sodium chloride. As the mixing continued, the above described gum arabic-polyvinylpyrrolidone solution was added in an amount of 2.3 weight percent based on the total weight of the sodium chloride, wetting agent, scenting agent and glucono-delta-lactone. The resulting mixture was then dried on trays at a temperature not exceeding 65° C. to form constituent C. If necessary constituent C can be sifted through a 10 mesh screen.

Constituents A, B and C were then blended together in a suitable mixer to form the desired effervescent enzymatic drain cleaner composition. This composition retains its enzyme potencies, has reduced caking tendencies upon storage over extended periods of time, and exhibits outstanding effectiveness in removing deposits from sink drains and other refuse conduits.

The amounts of the gum arabic-polyvinylpyrrolidone coating solution used in the above example are preferred, but it is understood that these amounts could vary depending upon the particular blending conditions being used.

While the above examples describe specific quantities and potencies of enzymes, bacteria, wetting agents and fillers, it should be understood that these items and quantities can be varied to achieve overall desired drain cleaning characteristics without departing from the scope of the present invention.

In summation, the present invention relates to an effervescent enzymatic drain cleaner composition having improved shelf life and effectiveness containing enzymes, bacteria, wetting agents, fillers and an effervescent couple containing glucono-delta-lactone and to a process for preparing such composition. This composition provides sustained effervescence over relatively long periods of time and enables the enzymes to completely penetrate massive drain plugs. This composition also clears partially plugged drains in a substantially shorter time than prior art drain cleaners.

What is claimed is:

1. A composition useful for removing deposits from refuse conduits which consists essentially of a mixture of enzymes which will attack the commonly encountered constituents of drain deposits and an effervescent couple consisting essentially of glucono-delta-lactone and a metal salt of carbonic acid wherein the metal is selected from the class consisting of alkali metals and alkaline earth metals, said glucono-delta-lactone being present in an amount from about 10 to about 45 weight percent and said metal salt of carbonic acid being present in an amount from about 8 to about 45 weight percent, said percents based on the total weight of the composition.

2. A composition according to claim 1 wherein the metal salt of carbonic acid is sodium bicarbonate.

3. A composition according to claim 1 wherein the glucono-delta-lactone is present in an amount of from about 10 to about 30 weight percent based on the total weight of the composition.

4. A composition according to claim 1 wherein the metal salt of carbonic acid is present in an amount of from about 10 to about 20 weight percent based on the total weight of the composition.

5. A composition according to claim 1 consisting essentially of a mixture of bacterial amylase, bacterial protease, lipase, non-pathogenic anaerobic bacteria, non-pathogenic aerobic bacteria, pectinase, ficin, glucono-delta-lactone, and sodium bicarbonate.

6. A process for producing an effervescent enzymatic drain cleaner composition which comprises (1) coating a mixture of enzymes which will attack the commonly encountered constituents of drain deposits with an aqueous mixture of about 6.5 percent (weight/volume basis) gum arabic and about 6.5 percent (weight/volume basis) polyvinylpyrrolidone and then drying the coated enzyme mixture at room temperature; (2) coating a metal salt of carbonic acid wherein the metal is selected from the class consisting of alkali metals and alkaline earth metals with the above-described aqueous mixture of gum arabic and polyvinylpyrrolidone and then drying the coated metal salt at a temperature not exceeding 60° C.; (3) coating glucono-delta-lactone with the above-described aqueous mixture of gum arabic and polyvinylpyrrolidone and then drying the coated compound at a temperature not exceeding 65° C.; and (4) mechanically blending the individual coated products of above steps (1), (2) and (3) into a homogeneous mixture containing from about 10 to about 45 weight percent glucono-delta-lactone and from about 8 to about 45 weight percent of the metal salt of carbonic acid.

7. A composition according to claim 1 wherein the components of the mixture are individually coated prior to mixing with a dried residue of an aqueous mixture of about 6.5 percent (weight/volume basis) gum arabic and about 6.5 percent (weight/volume basis) polyvinylpyrrolidone.

References Cited

UNITED STATES PATENTS

| 1,505,534 | 8/1924 | Boidin et al. | 195—2 |
| 1,661,512 | 3/1928 | Sullivan | 252—157 |
| 2,497,057 | 2/1950 | Pape et al. | 252—157 |
| 3,019,171 | 1/1962 | Bloch et al. | 195—68 |

FOREIGN PATENTS

| 265,024 | 2/1927 | Great Britain. |

LEON D. ROSDOL, Primary Examiner

WILLIAM E. SCHULZ, Assistant Examiner

U.S. Cl. X.R.

134—22; 195—68; 210—18; 252—188.3, 192